United States Patent
Longenecker

(10) Patent No.: US 11,674,706 B2
(45) Date of Patent: Jun. 13, 2023

(54) SYSTEM AND METHOD FOR OPERATING AN AIR CONDITIONER UNIT HAVING AN AUXILIARY ELECTRIC HEATER

(71) Applicant: Haier US Appliance Solutions, Inc., Wilmington, DE (US)

(72) Inventor: Joshua Duane Longenecker, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 17/469,937

(22) Filed: Sep. 9, 2021

(65) Prior Publication Data
US 2023/0073117 A1    Mar. 9, 2023

(51) Int. Cl.
| | | |
|---|---|---|
| F24F 11/65 | (2018.01) | |
| F24F 1/0375 | (2019.01) | |
| F25B 49/02 | (2006.01) | |
| F25B 30/02 | (2006.01) | |
| F24D 15/04 | (2006.01) | |
| F24D 19/10 | (2006.01) | |
| F24F 110/20 | (2018.01) | |

(Continued)

(52) U.S. Cl.
CPC .............. *F24F 11/65* (2018.01); *F24D 15/04* (2013.01); *F24D 19/1087* (2013.01); *F24F 1/0375* (2019.02); *F25B 30/02* (2013.01); *F25B 49/022* (2013.01); *F24F 2110/10* (2018.01); *F24F 2110/20* (2018.01); *F24F 2140/00* (2018.01); *F24F 2221/34* (2013.01); *F25B 2600/0253* (2013.01); *F25B 2600/11* (2013.01); *F25B 2700/21* (2013.01)

(58) Field of Classification Search
CPC ...... F24F 11/65; F24F 1/0375; F24F 2110/10; F24F 2110/20; F24F 2140/00; F24F 2221/34; F25B 30/02; F25B 49/022; F25B 2600/0253; F25B 2600/11; F25B 2700/21
See application file for complete search history.

(56) References Cited

U.S. PATENT DOCUMENTS 4,520,864 A * 6/1985 Katagiri ................ F24F 1/0328
                                                    261/80
5,299,430 A * 4/1994 Tsuchiyama ............ F24F 11/67
                                                    236/51
(Continued)

FOREIGN PATENT DOCUMENTS

| CN | 104075405 B | 8/2016 |
|---|---|---|
| CN | 105987485 A | 10/2016 |

(Continued)

OTHER PUBLICATIONS https://www.aireserv.com/about/blog/2020/february/what-does-aux-heat-mean-on-my-thermostat-/.

*Primary Examiner* — Nelson J Nieves
(74) *Attorney, Agent, or Firm* — Dohty & Manning, P.A.

(57) ABSTRACT

An air conditioner unit includes a refrigeration loop, a variable speed compressor coupled to the refrigeration loop, an indoor temperature sensor, an electric heater, and a controller operably coupled to the variable speed compressor, the indoor temperature sensor, and the electric heater. The controller is configured to operate the variable speed compressor at a target speed, identify an auxiliary heating trigger of the air conditioner unit, and operate the electric heater according to the auxiliary heating trigger.

19 Claims, 8 Drawing Sheets

(51) Int. Cl.
 *F24F 140/00* (2018.01)
 *F24F 110/10* (2018.01)

(56) References Cited

U.S. PATENT DOCUMENTS

| | | | | | |
|---|---|---|---|---|---|
| 6,808,119 | B2* | 10/2004 | Lee | ................ | F25B 49/022 |
| | | | | | 62/238.7 |
| 11,118,794 | B1* | 9/2021 | Longenecker | ........ | F24F 1/0093 |
| 2004/0118933 | A1* | 6/2004 | Readio | .............. | F24D 12/02 |
| | | | | | 237/2 B |
| 2005/0234597 | A1* | 10/2005 | Harrod | .............. | F24F 11/86 |
| | | | | | 700/278 |
| 2006/0254297 | A1* | 11/2006 | Chen | ................ | F24F 11/86 |
| | | | | | 62/264 |
| 2007/0130975 | A1* | 6/2007 | Tsuboi | .............. | F25B 49/022 |
| | | | | | 62/510 |
| 2011/0303755 | A1* | 12/2011 | Ariga | ................ | F24F 11/63 |
| | | | | | 237/2 A |
| 2015/0158369 | A1* | 6/2015 | Greiner | .............. | F25B 49/02 |
| | | | | | 62/89 |
| 2016/0061466 | A1* | 3/2016 | Billman | .............. | F24F 11/83 |
| | | | | | 165/121 |
| 2016/0109161 | A1* | 4/2016 | Ariga | ................ | F25B 49/02 |
| | | | | | 62/238.7 |
| 2020/0132320 | A1* | 4/2020 | Shaffer | .............. | F24F 11/32 |
| 2020/0132334 | A1* | 4/2020 | Shaffer | .............. | F24F 11/70 |
| 2020/0278128 | A1* | 9/2020 | Patel | ................ | F24F 1/0375 |
| 2020/0340699 | A1* | 10/2020 | Ebina | ................ | F25B 41/24 |
| 2021/0333008 | A1* | 10/2021 | Pilli | ................ | F28D 1/024 |
| 2022/0325929 | A1* | 10/2022 | Lord | ................ | F24F 11/36 |

FOREIGN PATENT DOCUMENTS

| | | |
|---|---|---|
| CN | 104613593 B | 6/2017 |
| CN | 111023401 A | 4/2020 |
| KR | 20170109309 A | 9/2017 |

\* cited by examiner

SYSTEM AND METHOD FOR OPERATING AN AIR CONDITIONER UNIT HAVING AN AUXILIARY ELECTRIC HEATER

FIELD OF THE INVENTION

The present subject matter relates generally to air conditioner units, and more particularly to methods of operating air conditioner units having auxiliary electric heaters.

BACKGROUND OF THE INVENTION

Air conditioner or conditioning units are conventionally utilized to adjust the temperature indoors, e.g., within structures such as dwellings and office buildings. Such units commonly include a closed refrigeration loop to heat or cool the indoor air. Typically, the indoor air is recirculated while being heated or cooled. A variety of sizes and configurations are available for such air conditioner units. For example, some units may have one portion installed within the indoors that is connected to another portion located outdoors, e.g., by tubing or conduit carrying refrigerant. These types of units are typically used for conditioning the air in larger spaces.

Another type of air conditioner unit, commonly referred to as single-package vertical units (SPVU) or package terminal air conditioners (PTAC), may be utilized to adjust the temperature in, for example, a single room or group of rooms of a structure. These units typically operate like split heat pump systems, except that the indoor and outdoor portions are defined by a bulkhead and all system components are housed within a single package that installed in a wall sleeve positioned within an opening of an exterior wall of a building. When a conventional PTAC is operating in a cooling or heating mode, a compressor circulates refrigerant within a sealed system, while indoor and outdoor fans urge flows of air across indoor and outdoor heat exchangers respectively.

Notably, in some extreme conditions, the operation of the heat pump is not enough to provide adequate heating (or cooling) to a room. For instance, very cold temperatures, initiation of a heat pump cycle after a long dormant period, or other increased loads may be more than the typical heat pump can handle. The compressor associated with the closed refrigeration loop may only operate safely up to a certain compressor speed, which may be inadequate for immediate needs. Accordingly, some air conditioner units incorporate an auxiliary electric heater.

Conventionally, thermostats send a signal to the air conditioner unit to run in either heat pump mode (via the closed loop refrigeration system) or in electric mode (via the electric heater). However, this operation presents drawbacks. For example, operating in electric mode can be inefficient, resulting in unnecessary electricity usage and inconvenience to a user. Moreover, conventional air conditioner units may turn on or off an auxiliary electric heater at inopportune times.

Accordingly, improved air conditioner units and methods of operation to more effectively incorporate an auxiliary electric heater would be useful. More specifically, an air conditioner unit that regulates the use of the auxiliary electric heater would be particularly beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an air conditioner unit is provided. The air conditioning unit may include a refrigeration loop comprising an outdoor heat exchanger and an indoor heat exchanger; a variable speed compressor operably coupled to the refrigeration loop and being configured to urge a flow of refrigerant through the outdoor heat exchanger and the indoor heat exchanger; an indoor temperature sensor configured to detect an indoor temperature of a room; an electric heater provided within the air conditioner unit and configured to selectively produce heat to be supplied to the room according to a first power level or a second power level, the second power level being greater than the first power level; and a controller operably coupled to the variable speed compressor, the indoor temperature sensor, and the electric heater. The controller may be configured to operate the variable speed compressor at a target compressor speed; identify an auxiliary heating trigger of the air conditioner unit, wherein the auxiliary heating trigger is based on at least one of a setpoint error, a compressor limit speed, or a dew point temperature of the room; and operate the electric heater according to the auxiliary heating trigger of the air conditioner unit.

According to another exemplary aspect of the present disclosure, a method of operating an air conditioner unit is provided. The air conditioner unit may include a refrigeration loop, a variable speed compressor operably coupled to the refrigeration loop and being configured to urge a flow of refrigerant through the refrigeration loop, a temperature sensor operably coupled to the refrigeration loop, and an electric heater provided within the air conditioner unit. The method may include operating the variable speed compressor at a target compressor speed; identifying an auxiliary heating trigger of the air conditioner unit; and operating the electric heater at one of a first power level or a second power level greater than the first power level according to the auxiliary heating trigger of the air conditioner unit, wherein the auxiliary heating trigger is at least one of a setpoint error, a compressor limit speed, or a dew point temperature of a room.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
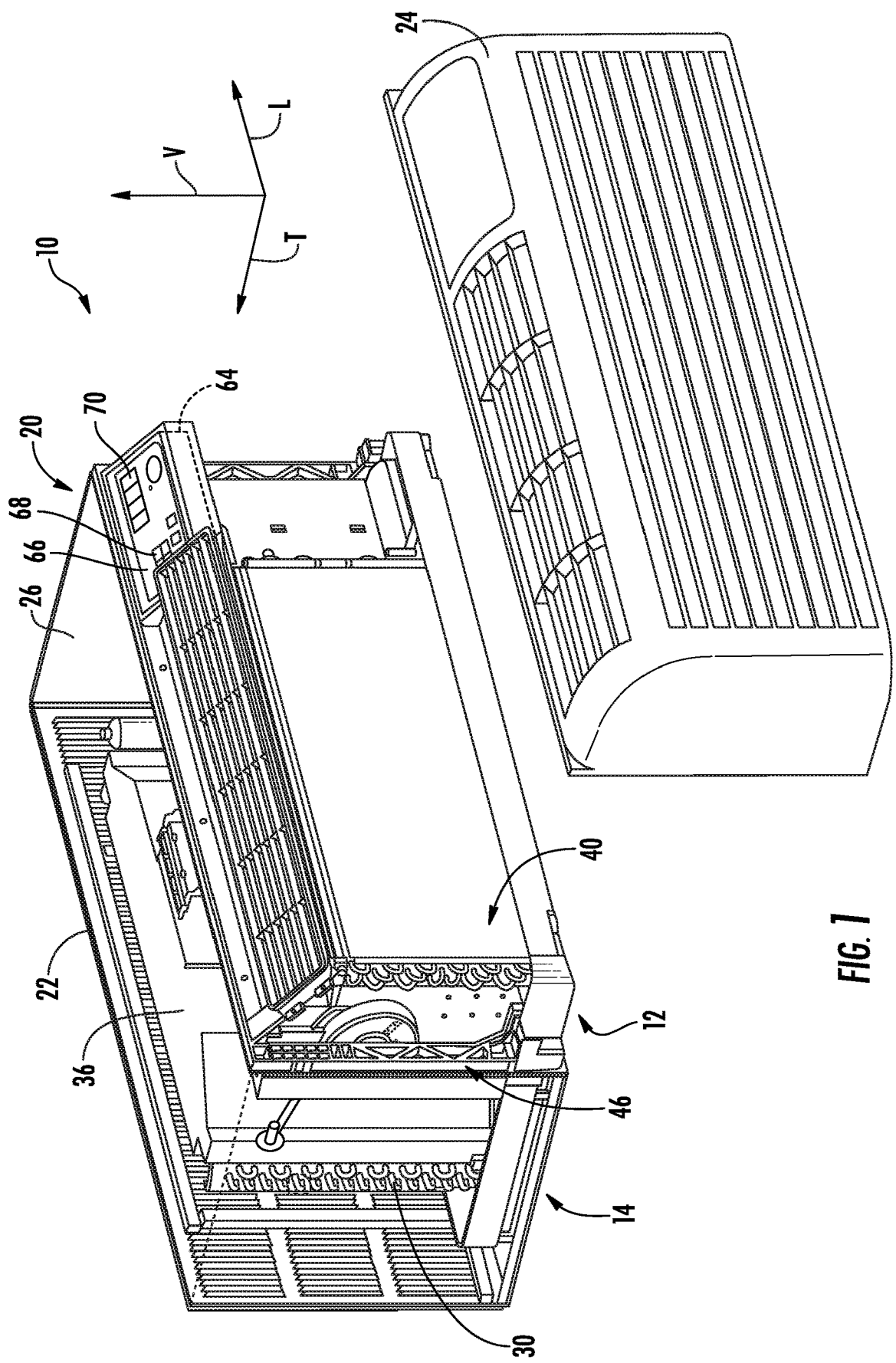
FIG. 1 provides a perspective view of an air conditioner unit, with part of an indoor portion exploded from a remainder of the air conditioner unit for illustrative purposes, in accordance with one exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
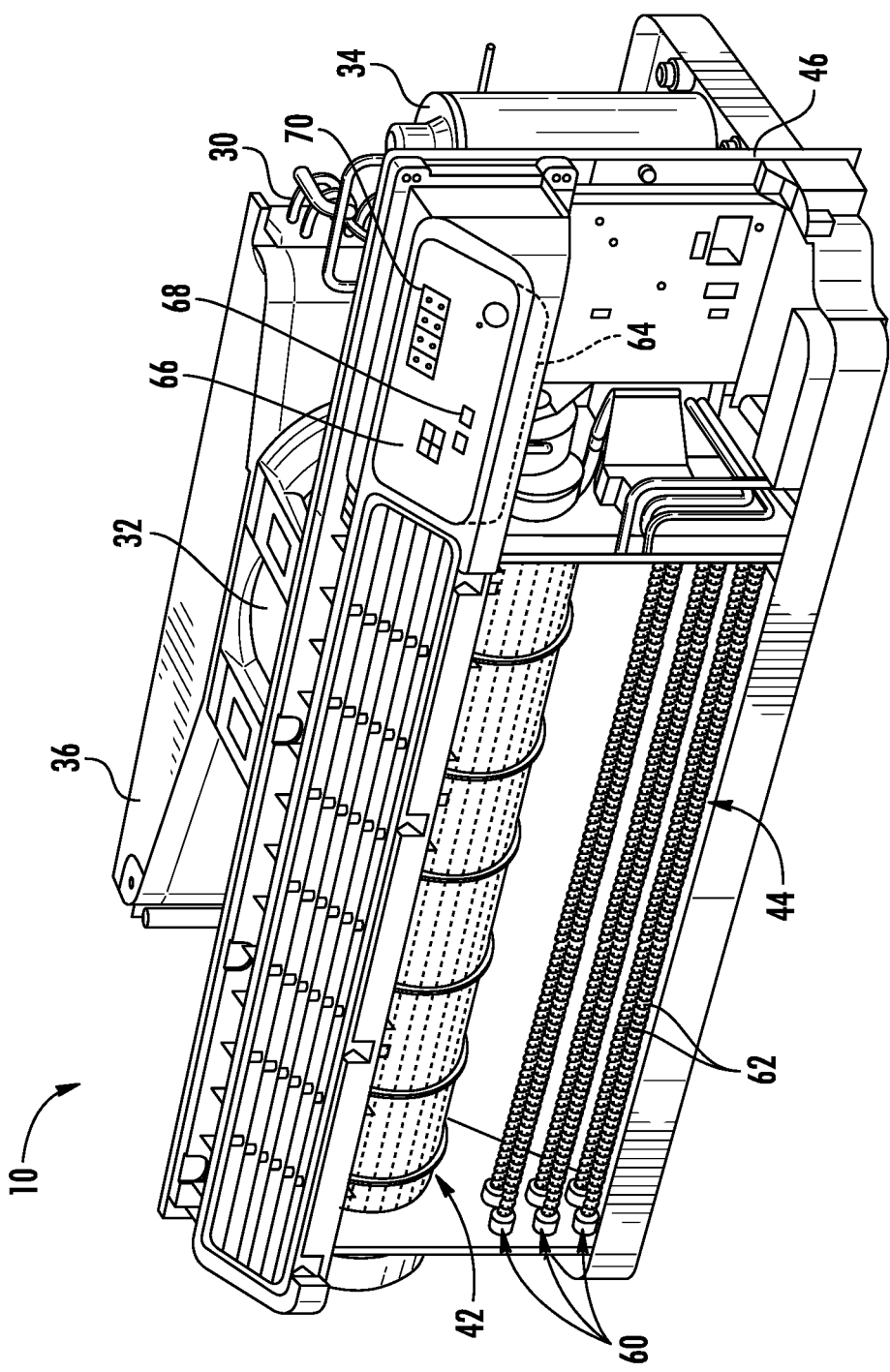
FIG. 2 is another perspective view of components of the indoor portion of the exemplary air conditioner unit of FIG. 1.

Referring now to FIGS. 1 and 2, an air conditioner unit 10 is provided. The air conditioner unit 10 is a one-unit type air conditioner, also conventionally referred to as a room air conditioner or a packaged terminal air conditioner (PTAC). The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, and the room front 24 may be part of the indoor portion 12. Components of the outdoor portion 14, such as an outdoor heat exchanger 30, an outdoor fan 32, and a compressor 34 may be housed within the wall sleeve 26. A fan shroud 36 may additionally enclose outdoor fan 32, as shown.

Indoor portion 12 may include, for example, an indoor heat exchanger 40, a blower fan or indoor fan 42, and a heating unit 44. These components may, for example, be housed behind the room front 24. Additionally, a bulkhead 46 may generally support and/or house various other components or portions thereof of the indoor portion 12, such as indoor fan 42 and the heating unit 44. Bulkhead 46 may generally separate and define the indoor portion 12 and outdoor portion 14.

Figure 3:
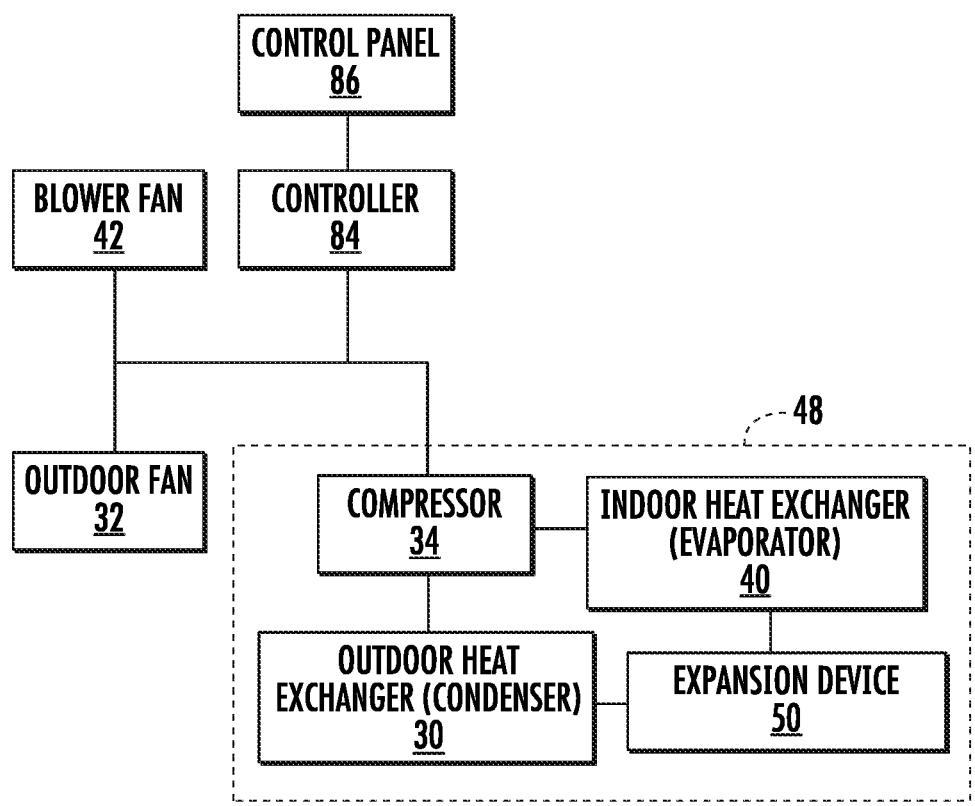
FIG. 3 is a schematic view of a refrigeration loop in accordance with one embodiment of the present disclosure.

Outdoor and indoor heat exchangers 30, 40 may be components of a sealed system or refrigeration loop 48, which is shown schematically in FIG. 3. Refrigeration loop 48 may, for example, further include compressor 34 and an expansion device 50. As illustrated, compressor 34 and expansion device 50 may be in fluid communication with outdoor heat exchanger 30 and indoor heat exchanger 40 to flow refrigerant therethrough as is generally understood. More particularly, refrigeration loop 48 may include various lines for flowing refrigerant between the various components of refrigeration loop 48, thus providing the fluid communication there between. Refrigerant may thus flow through such lines from indoor heat exchanger 40 to compressor 34, from compressor 34 to outdoor heat exchanger 30, from outdoor heat exchanger 30 to expansion device 50, and from expansion device 50 to indoor heat exchanger 40. The refrigerant may generally undergo phase changes associated with a refrigeration cycle as it flows to and through these various components, as is generally understood. Suitable refrigerants for use in refrigeration loop 48 may include pentafluoroethane, difluoromethane, or a mixture such as R410a, although it should be understood that the present disclosure is not limited to such examples and rather that any suitable refrigerant may be utilized.

As is understood in the art, refrigeration loop 48 may be alternately operated as a refrigeration assembly (and thus perform a refrigeration cycle) or a heat pump (and thus perform a heat pump cycle). As shown in FIG. 3, when refrigeration loop 48 is operating in a cooling mode and thus performing a refrigeration cycle, the indoor heat exchanger 40 acts as an evaporator and the outdoor heat exchanger 30 acts as a condenser. Alternatively, when the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils through which a refrigerant may flow for heat exchange purposes, as is generally understood.

According to an example embodiment, compressor 34 may be a variable speed compressor. In this regard, compressor 34 may be operated at various speeds depending on the current air conditioning needs of the room and the demand from refrigeration loop 48. For example, according to an exemplary embodiment, compressor 34 may be configured to operate at any speed between a minimum speed, e.g., 1500 revolutions per minute (RPM), to a maximum rated speed, e.g., 3500 RPM. Notably, use of variable speed compressor 34 enables efficient operation of refrigeration loop 48 (and thus air conditioner unit 10), minimizes unnecessary noise when compressor 34 does not need to operate at full speed, and ensures a comfortable environment within the room.

Specifically, according to an exemplary embodiment, compressor 34 may be an inverter compressor. In this regard, compressor 34 may include a power inverter, power electronic devices, rectifiers, or other control electronics suitable for converting an alternating current (AC) power input into a direct current (DC) power supply for the compressor. The inverter electronics may regulate the DC power output to any suitable DC voltage that corresponds to a specific operating speed of compressor. In this manner compressor 34 may be regulated to any suitable operating speed, e.g., from 0% to 100% of the full rated power and/or speed of the compressor. This may facilitate precise compressor operation at the desired operating power and speed, thus meeting system needs while maximizing efficiency and minimizing unnecessary system cycling, energy usage, and noise.

In exemplary embodiments as illustrated, expansion device 50 may be disposed in the outdoor portion 14 between the indoor heat exchanger 40 and the outdoor heat exchanger 30. According to the exemplary embodiment, expansion device 50 may be an electronic expansion valve that enables controlled expansion of refrigerant, as is known in the art. More specifically, electronic expansion device 50 may be configured to precisely control the expansion of the refrigerant to maintain, for example, a desired temperature differential of the refrigerant across the indoor heat exchanger 40. In other words, electronic expansion device 50 throttles the flow of refrigerant based on the reaction of the temperature differential across indoor heat exchanger 40 or the amount of superheat temperature differential, thereby ensuring that the refrigerant is in the gaseous state entering compressor 34. According to alternative embodiments, expansion device 50 may be a capillary tube or another suitable expansion device configured for use in a thermodynamic cycle.

According to the illustrated exemplary embodiment, outdoor fan 32 is an axial fan and indoor fan 42 is a centrifugal fan. However, it should be appreciated that according to alternative embodiments, outdoor fan 32 and indoor fan 42 may be any suitable fan type. In addition, according to an exemplary embodiment, outdoor fan 32 and indoor fan 42 are variable speed fans, e.g., similar to variable speed compressor 34. For example, outdoor fan 32 and indoor fan 42 may rotate at different rotational speeds, thereby generating different air flow rates. It may be desirable to operate fans 32, 42 at less than their maximum rated speed to ensure safe and proper operation of refrigeration loop 48 at less than its maximum rated speed, e.g., to reduce noise when full speed operation is not needed. In addition, according to alternative embodiments, fans 32, 42 may be operated to urge make-up air into the room.

According to the illustrated embodiment, indoor fan 42 may operate as an evaporator fan in refrigeration loop 48 to encourage the flow of air through indoor heat exchanger 40. Accordingly, indoor fan 42 may be positioned downstream of indoor heat exchanger 40 along the flow direction of indoor air and downstream of heating unit 44. Alternatively, indoor fan 42 may be positioned upstream of indoor heat exchanger 40 along the flow direction of indoor air and may operate to push air through indoor heat exchanger 40.

Heating unit 44 in exemplary embodiments includes one or more heater banks 60. Each heater bank 60 may be operated as desired to produce heat. In some embodiments as shown, three heater banks 60 may be utilized. Alternatively, however, any suitable number of heater banks 60 may be utilized. Each heater bank 60 may further include at least one heater coil or coil pass 62, such as in exemplary embodiments two heater coils or coil passes 62. Alternatively, other suitable heating elements may be utilized. In some embodiments, heating unit 44 is an electric heater. For instance, heating unit 44 may be selectively operated to supply additional heat (e.g., to supplement indoor heat exchanger 40).

Heating unit 44 may be operated at one of a first power level or a second power level. The first power level may be less than the second power level. For example, the first power level may be between about 500 Watts (W) and about 2000 W. In one example, the first power level is about 1000 W. Thus, as will be explained in more detail below, heating unit 44 may be operated in tandem with refrigeration loop 48 to provide auxiliary heat to a room. Additionally or alternatively, heating unit 44 may be operated at the second power level (greater than the first power level). The second power level may be between about 4000 W and about 6000 W. In one example, the second power level is about 5000 W. When heating unit 44 is operated at the second power level, refrigeration loop 48 may be deactivated, or turned off. In detail, variable speed compressor 34 may be halted so as not to pump refrigerant through refrigeration loop 48.

The operation of air conditioner unit 10 including compressor 34 (and thus refrigeration loop 48 generally) indoor fan 42, outdoor fan 32, heating unit 44, expansion device 50, and other components of refrigeration loop 48 may be controlled by a processing device such as a controller 64. Controller 64 may be in communication (via for example a suitable wired or wireless connection) to such components of the air conditioner unit 10. Controller 64 may include a memory and one or more processing devices such as microprocessors, CPUs or the like, such as general or special purpose microprocessors operable to execute programming instructions or micro-control code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 66 and one or more user inputs 68, which may be included in control panel 66. The user inputs 68 may be in communication with the controller 64. A user of the unit 10 may interact with the user inputs 68 to operate the unit 10, and user commands may be transmitted between the user inputs 68 and controller 64 to facilitate operation of the unit 10 based on such user commands. A display 70 may additionally be provided in the control panel 66, and may be in communication with the controller 64. Display 70 may, for example be a touchscreen or other text-readable display screen, or alternatively may simply be a light that can be activated and deactivated as required to provide an indication of, for example, an event or setting for the unit 10.

Figure 4:
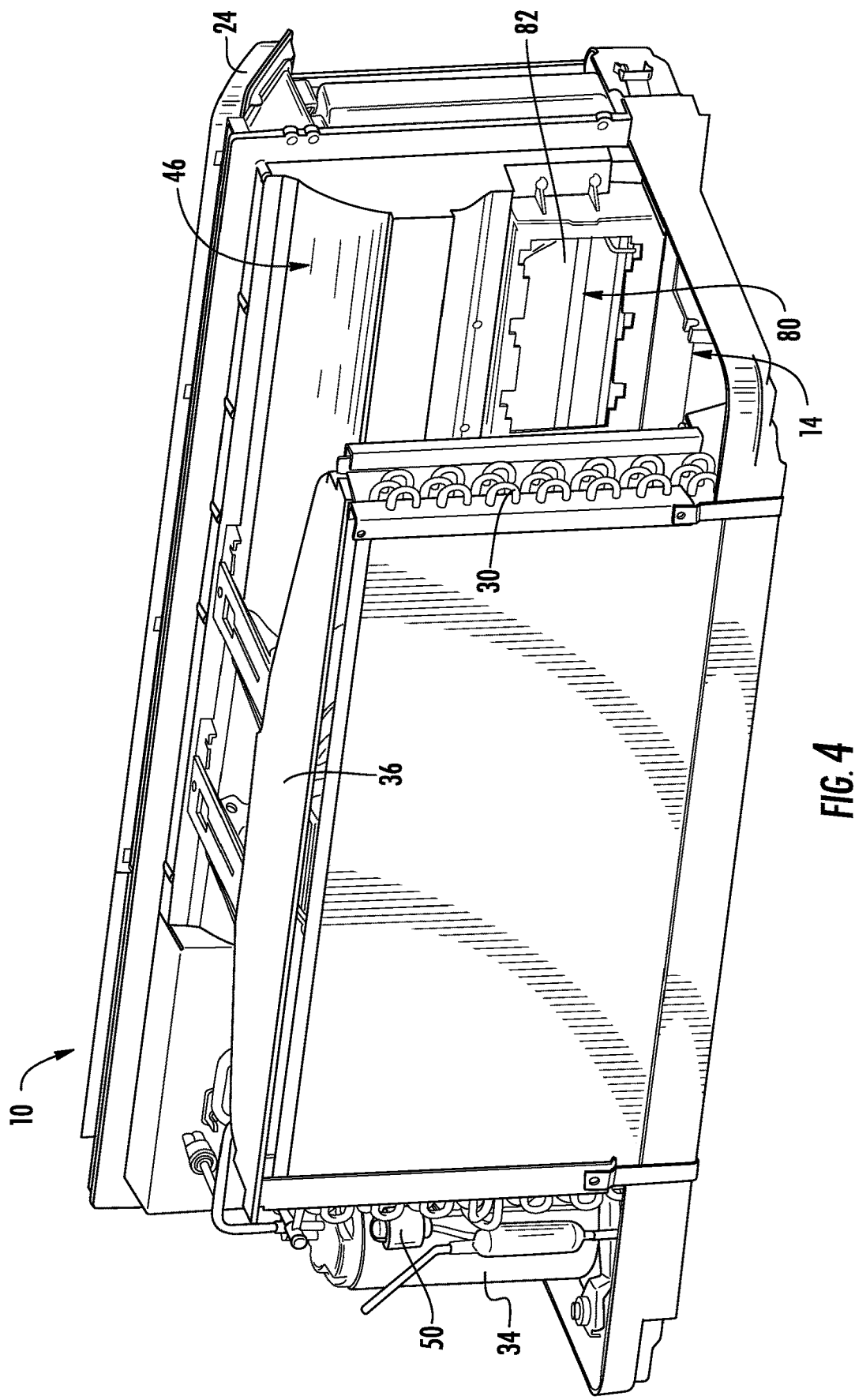
FIG. 4 is a rear perspective view of an outdoor portion of the exemplary air conditioner unit of FIG. 1, illustrating a vent aperture in a bulkhead in accordance with one embodiment of the present disclosure.

Referring briefly to FIG. 4, a vent aperture 80 may be defined in bulkhead 46 for providing fluid communication between indoor portion 12 and outdoor portion 14. Vent aperture 80 may be utilized in an installed air conditioner unit 10 to allow outdoor air to flow into the room through the indoor portion 12. In this regard, in some cases it may be desirable to allow outside air (i.e., "make-up air") to flow into the room in order, e.g., to meet government regulations, to compensate for negative pressure created within the room, etc. In this manner, according to an exemplary embodiment, make-up air may be provided into the room through vent aperture 80 when desired.

Figure 5:
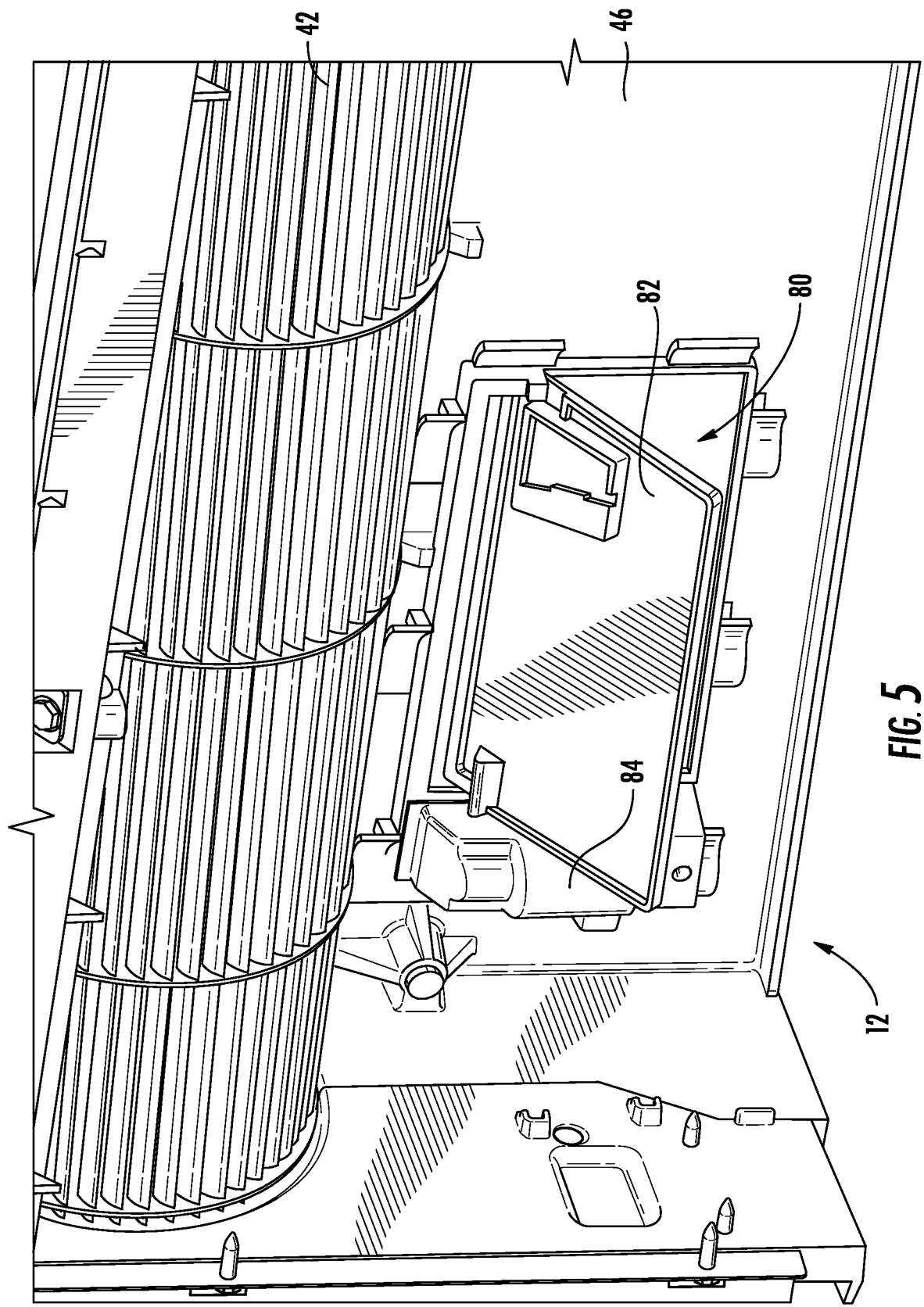
FIG. 5 is a front perspective view of the exemplary bulkhead of FIG. 4 with a vent door illustrated in the open position in accordance with one embodiment of the present disclosure.

As shown in FIG. 5, a vent door 82 may be pivotally mounted to the bulkhead 46 proximate to vent aperture 80 to open and close vent aperture 80. More specifically, as illustrated, vent door 82 is pivotally mounted to the indoor facing surface of indoor portion 12. Vent door 82 may be configured to pivot between a first, closed position where vent door 82 prevents air from flowing between outdoor portion 14 and indoor portion 12, and a second, open position where vent door 82 is in an open position (as shown in FIG. 5) and allows make-up air to flow into the room. According to the illustrated embodiment vent door 82 may be pivoted between the open and closed position by an electric motor 84 controlled by controller 64, or by any other suitable method.

In some cases, it may be desirable to treat or condition make-up air flowing through vent aperture 80 prior to blowing it into the room. For example, outdoor air which has a relatively high humidity level may require treating before passing into the room. In addition, if the outdoor air is cool, it may be desirable to heat the air before blowing it into the room. Therefore, according to an exemplary embodiment of the present subject matter, unit 10 may further include an auxiliary sealed system that is positioned over vent aperture 80 for conditioning make-up air. The auxiliary sealed system may be a miniature sealed system that acts similar to refrigeration loop 48, but conditions only the air flowing through vent aperture 80. According to alternative embodiments, such as that described herein, make-up air may be urged through vent aperture 80 without the assistance of an auxiliary sealed system. Instead, make-up air is urged through vent aperture 80 may be conditioned at least in part by refrigeration loop 48, e.g., by passing through indoor heat exchanger 40. Additionally, the make-up air may be conditioned immediately upon entrance through vent aperture 80 or sequentially after combining with the air stream induced through indoor heat exchanger 40. In still other embodiments, an additional heating unit 44 may be located at or near vent aperture 80 to condition the make-up air before being discharged into the room.

Figure 6:
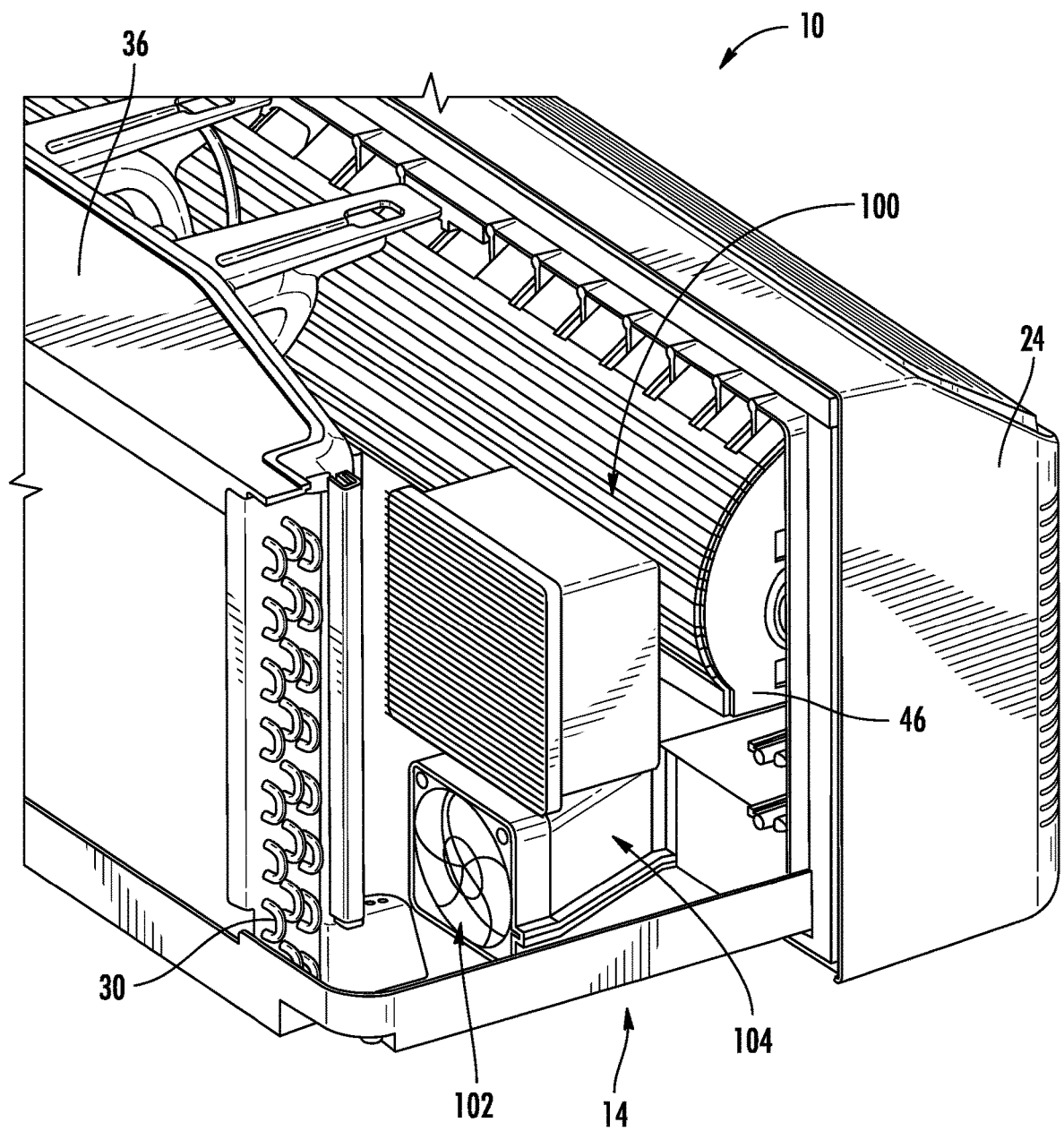
FIG. 6 is a rear perspective view of the exemplary air conditioner unit and bulkhead of FIG. 4 including a fan assembly for providing make-up air in accordance with one embodiment of the present disclosure.

Referring now to FIG. 6, a fan assembly 100 will be described according to an exemplary embodiment of the present subject matter. According to the illustrated embodiment, fan assembly 100 is generally configured for urging the flow of make-up air through vent aperture 80 and into a conditioned room without the assistance of an auxiliary sealed system. However, it should be appreciated that fan assembly 100 could be used in conjunction with a make-up air module including an auxiliary sealed system for conditioning the flow of make-up air. As illustrated, fan assembly 100 includes an auxiliary fan 102 for urging a flow of make-up air through a fan duct 104 and into indoor portion 12 through vent aperture 80.

According to the illustrated embodiment, auxiliary fan 102 is an axial fan positioned at an inlet of fan duct 104, e.g., upstream from vent aperture 80. However, it should be appreciated that any other suitable number, type, and configuration of fan or blower could be used to urge a flow of makeup air according to alternative embodiments. In addition, auxiliary fan 102 may be positioned in any other suitable location within air conditioner unit 10 and auxiliary fan 102 may be positioned at any other suitable location within or in fluid communication with fan duct 104. The embodiments described herein are only exemplary and are not intended to limit the scope present subject matter.

Figure 7:
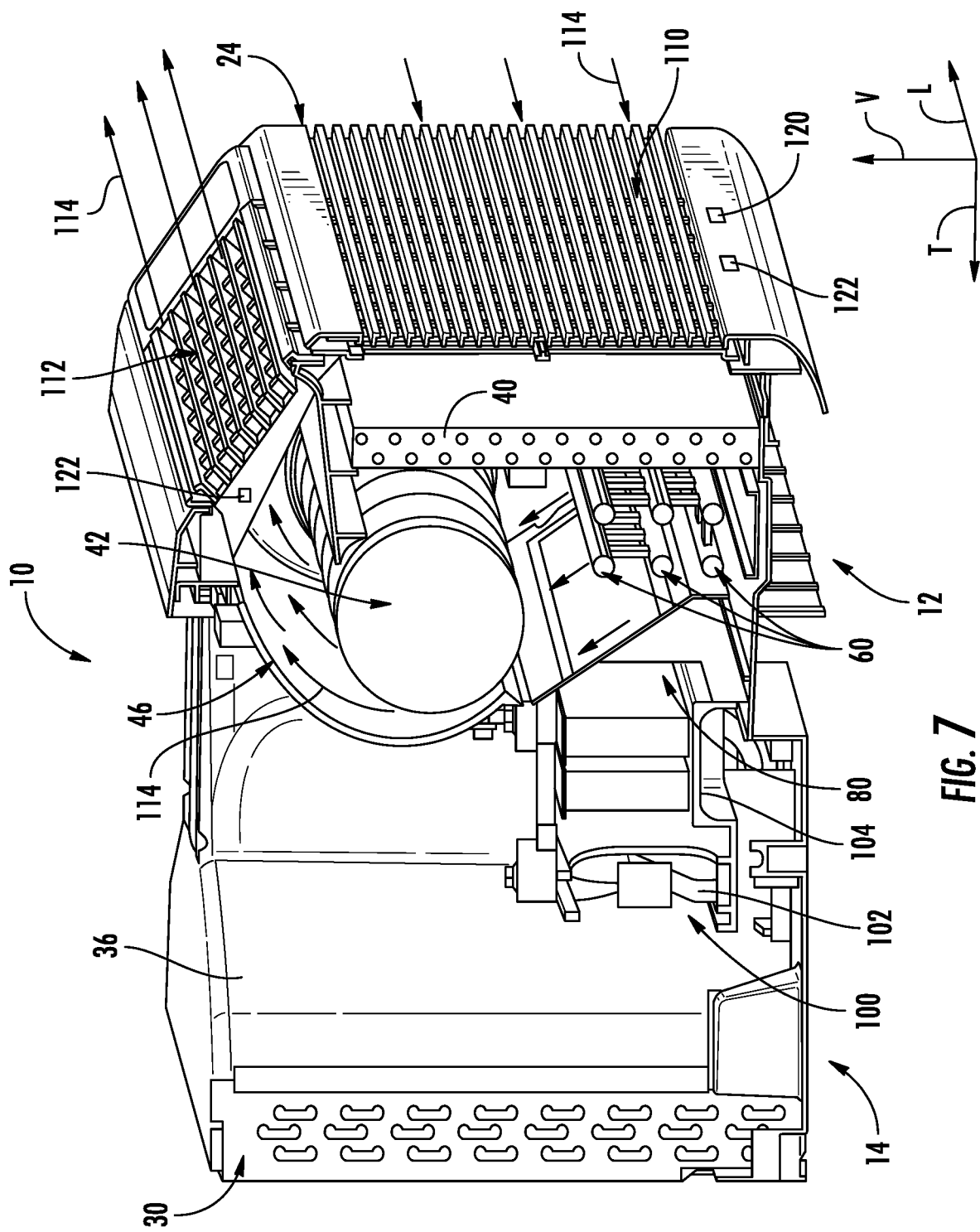
FIG. 7 is a side cross sectional view of the exemplary air conditioner unit of FIG. 1.
Figure 8:
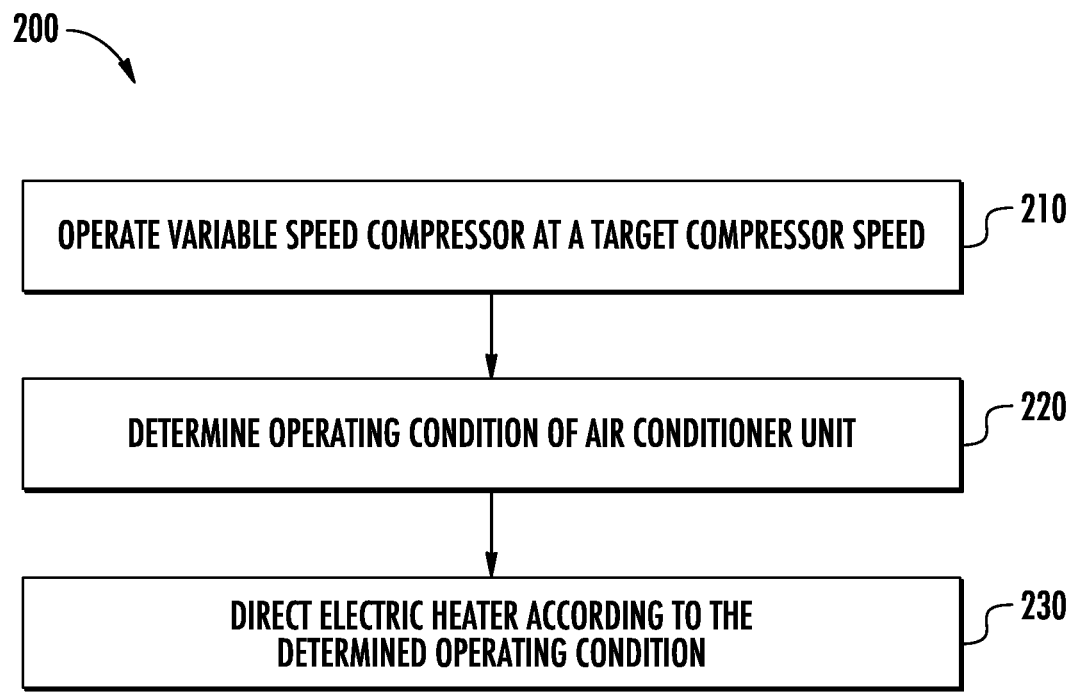
FIG. 8 illustrates a method for controlling a variable speed compressor of a packaged terminal air conditioner unit in accordance with one embodiment of the present disclosure.

Referring now to FIG. 7, operation of unit 10 will be described according to an exemplary embodiment. More specifically, the operation of components within indoor portion 12 will be described during a cooling operation or cooling cycle of unit 10. To simplify discussion, the operation of auxiliary fan 102 for providing make-up air through vent aperture 80 will be omitted, e.g., as if vent door 82 were closed. Although a cooling cycle will be described, it should be further appreciated that indoor heat exchanger 40 and/or heating unit 44 be used to heat indoor air according to alternative embodiments. Moreover, although operation of unit 10 is described below for the exemplary packaged terminal air conditioner unit, it should be further appreciated that aspects the present subject matter may be used in any other suitable air conditioner unit, such as a heat pump or split unit system.

As illustrated, room front 24 of unit 10 generally defines an intake vent 110 and a discharge vent 112 for use in circulating a flow of air (indicated by arrows 114) throughout a room. In this regard, indoor fan 42 is generally configured for drawing in air 114 through intake vent 110 and urging the flow of air through indoor heat exchanger 40 before discharging the air 114 out of discharge vent 112. According to the illustrated embodiment, intake vent 110 is positioned proximate a bottom of unit 10 and discharge vent 112 is positioned proximate a top of unit 10. However, it should be appreciated that according to alternative embodiments, intake vent 110 and discharge vent 112 may have any other suitable size, shape, position, or configuration.

During a cooling cycle, refrigeration loop 48 is generally configured for urging cold refrigerant through indoor heat exchanger 40 in order to lower the temperature of the flow of air 114 before discharging it back into the room. Specifically, during a cooling operation, controller 64 may be provided with a target temperature, e.g., as set by a user for the desired room temperature. In general, components of refrigeration loop 48, outdoor fan 32, indoor fan 42, and other components of unit 10 operate to continuously cool the flow of air.

In order to facilitate operation of refrigeration loop 48 and other components of unit 10, unit 10 may include a variety of sensors for detecting conditions internal and external to the unit 10. These conditions can be fed to controller 64 which may make decisions regarding operation of unit 10 to rectify undesirable conditions or to otherwise condition the flow of air 114 into the room. For example, as best illustrated in FIG. 7, unit 10 may include an indoor temperature sensor 120 which is positioned and configured for measuring the indoor temperature within the room. In addition, unit 10 may include an indoor humidity sensor 122 which is positioned and configured for measuring the indoor humidity within the room. In this manner, unit 10 may be used to regulate the flow of air 114 into the room until the measured indoor temperature reaches the desired target temperature and/or humidity level.

However, in some embodiments, controller 64 may receive inputs from disconnected thermostats. For instance, a separate thermostat into which a user inputs a target temperature may only send an "on-off" signal to controller 64, without acknowledging a target temperature. These may be referred to as "bang-bang," "dumb," or unmodulated thermostats. According to these embodiments, controller 64 may estimate the target temperature input and desired by the user. Controller 64 may utilize one or more direct inputs (e.g., from indoor temperature sensor 120) to determine the estimated target temperature.

As used herein, "temperature sensor" or the equivalent is intended to refer to any suitable type of temperature measuring system or device positioned at any suitable location for measuring the desired temperature. Thus, for example, temperature sensor 120 may each be any suitable type of temperature sensor, such as a thermistor, a thermocouple, a resistance temperature detector, a semiconductor-based integrated circuit temperature sensors, etc. In addition, temperature sensor 120 may be positioned at any suitable location and may output a signal, such as a voltage, to a controller that is proportional to and/or indicative of the temperature being measured. Although exemplary positioning of temperature sensors is described herein, it should be appreciated that unit 10 may include any other suitable number, type, and position of temperature, humidity, and/or other sensors according to alternative embodiments.

As used herein, the terms "humidity sensor" or the equivalent may be intended to refer to any suitable type of humidity measuring system or device positioned at any suitable location for measuring the desired humidity. Thus, for example, humidity sensor 122 may refer to any suitable type of humidity sensor, such as capacitive digital sensors, resistive sensors, and thermal conductivity humidity sensors. In addition, humidity sensor 122 may be positioned at any suitable location and may output a signal, such as a voltage, to a controller that is proportional to and/or indicative of the humidity being measured. Although exemplary positioning of humidity sensors is described herein, it should be appreciated that unit 10 may include any other suitable number, type, and position of humidity sensors according to alternative embodiments.

Now that the construction of air conditioner unit 10 and the configuration of controller 64 according to exemplary embodiments have been presented, an exemplary method 200 of operating a packaged terminal air conditioner unit will be described. Although the discussion below refers to the exemplary method 200 of operating air conditioner unit 10, one skilled in the art will appreciate that the exemplary method 200 are applicable to the operation of a variety of other air conditioning appliances. In exemplary embodiments, the various method steps as disclosed herein may be performed by controller 64 or a separate, dedicated controller.

At step 210, method 200 may include operating the variable speed compressor (e.g., compressor 34) at a target compressor speed. In detail, the controller (e.g., controller 64) may operate the variable speed compressor at an initial speed. For instance, it may be desirable to operate the variable speed compressor according to a more active, closed-loop control system (e.g., as incorporated by the controller). In this regard, the closed-loop control system may rely on temperature and/or humidity feedback from one or more system sensors (e.g., such as indoor temperature sensor 120 and indoor humidity sensor 122). According to some embodiments, the closed-loop feedback control algorithm may include a proportional control algorithm, a proportional-integral control algorithm (e.g., a PI controller), or a proportional-integral-derivative control algorithm (e.g., a PID controller). In general, the closed-loop feedback control algorithm may operate the variable speed compressor to minimize a difference between the detected actual indoor temperature and the estimated target temperature. In this regard, implementation of the closed-loop feedback control algorithm may include determining an error value between the actual indoor temperature and the target temperature (e.g., as input by a user or as estimated by the controller) and passing or inputting the error value into the closed-loop feedback control algorithm to generate a target compressor speed as a control input that minimizes the error.

According to this embodiment, the refrigeration loop (e.g., refrigeration loop 48) is running in the heat pump mode. Accordingly, at step 220, method 200 may include identifying an auxiliary heating trigger of the air conditioner unit. The auxiliary heating trigger may be at least one of a setpoint error, a compressor limit speed, or a dew point temperature of the room. For instance, the controller may analyze one or more operating conditions of the air conditioner unit and determine that auxiliary heat is required. In this description, auxiliary heat may refer to an operation of an auxiliary electric heater (e.g., heating unit 44) in addition to an operation of the refrigeration loop.

In some instances, the controller may determine that the setpoint error is greater than a first setpoint threshold. In detail, the controller may recognize that a user has input a first setpoint temperature. The first setpoint temperature may be directly known (e.g., as input by the user) or may be estimated. For example, the controller estimates the setpoint temperature via on/off operations of the variable speed compressor together with detected indoor temperatures (e.g., the first setpoint threshold may be an amount above which the controller determines that the heat pump system is ineffective at heating the room). The first setpoint threshold may be between about 2 degrees Fahrenheit (° F.) and about 3° F. Accordingly, if a setpoint error is greater than the first setpoint threshold, the controller may determine that the heat pump is ineffective and require auxiliary heat.

Thus, at step 230, method 200 may include operating the electric heater according to the determined auxiliary heating trigger. For instance, upon determining that the setpoint error is greater than the first setpoint threshold (but less than a second setpoint threshold, described below), the controller may maintain the compressor at the target compressor speed. According to this embodiment, the target compressor speed may or may not be a maximum compressor speed. In detail, the compressor may be running at a low compressor load (e.g., below 4000 revolutions per minute (RPM)). The controller may then maintain the compressor at the target speed. Additionally or alternatively, the controller may operate the electric heater at the first power level. According to this embodiment, the electric heater may provide auxiliary heat to the room, e.g., on top of the heat generated by the indoor heat exchanger on the refrigeration loop (heat pump). As discussed previously, the first power level may be about 1000 W. Advantageously, additional auxiliary heat may be provided to the room to "boost" the heating ability without switching to a full electric power mode, which may be less efficient and more costly to the user.

Optionally, the controller may determine that the setpoint error is greater than the second setpoint threshold, the second setpoint threshold being greater than the first setpoint threshold. In detail, the second setpoint threshold may be between about 4° F. and about 5° F. Thus, when the setpoint error is greater than the second setpoint threshold, the controller may halt the operation of the variable speed compressor. In detail, the controller may turn off the refrigeration loop (heat pump). Additionally or alternatively, the controller may then operate the electric heater at the second power level. As discussed previously, the second power level may be about 5000 W.

According to another embodiment, the auxiliary heating trigger may be a compressor limit speed. In detail, the controller may determine that an operating speed (e.g., RPM) of the variable speed compressor is at a compressor limit speed. The compressor limit speed may be a top speed at which the controller determines an operation of the compressor may no longer be stable, or may no longer produce adequate heat. The compressor limit speed may be between about 4000 RPM and about 6000 RPM. In some embodiments, the compressor speed limit may be about 4500 RPM. Thus, in the case of the closed-loop feedback control of the variable speed compressor, the controller may determine when the compressor speed reaches the compressor limit speed. Accordingly, the controller may then maintain the compressor at the target compressor speed (e.g., the compressor limit speed). Additionally or alternatively, the controller may then operate the electric heater at the first power level (e.g., about 1000 W). Advantageously, the auxiliary electric heater may supply additional heat on top of the heat generated by the indoor heat exchanger to be supplied to the room.

In some embodiments, the controller may continually monitor the operating speed of the variable speed compressor. For instance, the controller may determine that the compressor speed is reduced. In detail, after operating the electric heater for a certain amount of time, the room temperature may begin to rise. Within the closed-loop feedback control of the variable speed compressor, the compressor speed may thus begin to slow down as less heat is required within the room. The controller may determine that the refrigeration loop (e.g., heat pump) is able to sufficiently supply the required heat at this point. Accordingly, the controller may cease operation of the electric heater.

In some embodiments, the air conditioner unit may perform a dehumidifying operation. In detail, when the air conditioner unit is performing a cooling operation (e.g., operated as a refrigeration assembly), the air conditioner unit may utilize the evaporator coils to dehumidify the air flowing into the room. In determining when a dehumidification process is required, the controller may determine a dew point temperature of the room. In detail, the dew point temperature may be determined via an indoor temperature and an indoor humidity. The indoor temperature and indoor humidity may be measured by sensors provided within the room (e.g., indoor temperature sensor 120 and indoor humidity sensor 122). It should be understood that determining the dew point temperature of the room is well known in the art, and a detailed description will be omitted for brevity. In some embodiments, the controller may determine a first dew point threshold and a second dew point threshold greater than the first dew point threshold. In some embodiments, the first dew point threshold is about 5° F. above a target dew point temperature. Moreover, the second dew point threshold may be about 10° F. above the target dew point temperature. The target dew point temperature may be predetermined and stored within the controller (e.g., within the memory).

The dehumidification process may include adjusting an operating speed of an indoor fan (e.g., indoor fan 42) and an outdoor fan (e.g., outdoor fan 32). For instance, when the dew point temperature is greater than the first dew point threshold, the controller may increase the compressor speed of the variable speed compressor (e.g., above the target compressor speed). Because the compressor speed is increased, a further cooling of the room may be experienced. In order to avoid an unwanted cooling of the room, the controller may decrease a speed of the indoor fan. Additionally or alternatively, the controller may increase a speed of the outdoor fan, reducing the indoor coil temperature and reducing a sensible heat ratio. Accordingly, an increase in dehumidification of the air supplied to the room may be experienced without excessive cooling of the room. A predetermined hysteresis may be incorporated into each reading (e.g., the dew point temperature, indoor temperature, indoor humidity, etc.) to avoid sudden and unwanted or unnecessary changes in compressor speed, indoor fan speed, and/or outdoor fan speed. For example, the controller may account for a hysteresis when directing the compressor speed and/or the power level of the electric heater.

Moreover, the controller may monitor a temperature of the indoor coils (e.g., of the indoor heat exchanger). The temperature of the indoor coils may be compared to a third dew point threshold to determine a proper compressor speed of the variable speed compressor. The third dew point threshold may be less than the actual dew point temperature (e.g., as calculated from the indoor temperature and the indoor humidity). In some embodiments, the third dew point threshold is about 5° F. less than the actual dew point temperature. For example, when the temperature of the indoor coils (indoor heat exchanger) is greater than the third dew point threshold and the dew point temperature is greater than the first dew point threshold, the controller may increase the compressor speed. Additionally or alternatively, the compressor speed may be increased incrementally. The incremental increase in compressor speed may be between about 50 RPM and about 300 RPM. Accordingly, each time the controller determines that the compressor speed must be increased, the compressor speed is increased incrementally.

In some cases, the dew point temperature may elevate above the second dew point threshold. Upon determining that the dew point temperature is above the second dew point threshold, the controller may maintain the compressor at the target speed. In this instance, the target compressor speed may be the initial compressor speed (e.g., at the start of a cooling cycle), or may be an increased compressor speed (e.g., increased incrementally as described above). Additionally or alternatively, the controller may operate the electric heater at the first power level. In detail, the refrigeration cycle of the refrigeration loop may produce more cool air than is desired within the room. Accordingly, the electric heater may provide a boost heat to the air after the dehumidification process in order to maintain the temperature of the room at the desired level while continuing to dehumidify the air.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioner unit comprising:
a refrigeration loop comprising an outdoor heat exchanger and an indoor heat exchanger;
a variable speed compressor operably coupled to the refrigeration loop and being configured to urge a flow of refrigerant through the outdoor heat exchanger and the indoor heat exchanger;
an indoor temperature sensor configured to detect an indoor temperature of a room;
an electric heater provided within the air conditioner unit and configured to selectively produce heat to be supplied to the room according to a first power level or a second power level, the second power level being greater than the first power level; and
a controller operably coupled to the variable speed compressor, the indoor temperature sensor, and the electric heater, the controller being configured to:
operate the variable speed compressor at a target compressor speed;
identify an auxiliary heating trigger of the air conditioner unit, wherein the auxiliary heating trigger is based on at least one of a setpoint error, the setpoint error being a difference between an actual indoor temperature and a setpoint temperature, a compressor limit speed, or a dew point temperature of the room;
determine the setpoint error is greater than a first setpoint threshold;
maintain the variable speed compressor at the target compressor speed; and
operate the electric heater at the first power level.

2. The air conditioner unit of claim 1, wherein the target compressor speed is obtained at least in part by a closed-loop feedback control algorithm, the closed-loop feedback control algorithm comprising a proportional-integral control algorithm.

3. The air conditioner unit of claim 2, wherein the controller is further configured to:
determine the setpoint error is greater than a second setpoint threshold, the second setpoint threshold being greater than the first setpoint threshold;
halt the operation of the variable speed compressor; and
operate the electric heater at the second power level.

4. The air conditioner unit of claim 3, wherein the first setpoint threshold is between 2- and 3-degrees Fahrenheit, and the second setpoint threshold is between 4- and 5-degrees Fahrenheit.

5. The air conditioner unit of claim 2, wherein the auxiliary heating trigger comprises the compressor limit speed, the compressor limit speed being about 4500 revolutions per minute, wherein the controller is further configured to:
determine that the target compressor speed is the compressor limit speed;
maintain the variable speed compressor at the target compressor speed; and
operate the electric heater at the first power level.

6. The air conditioner unit of claim 5, wherein the controller is further configured to:
determine that the target compressor speed has been reduced below the compressor limit speed; and
cease the operation of the electric heater.

7. The air conditioner unit of claim 2, further comprising:
an outdoor fan configured to direct air over the outdoor heat exchanger;
an indoor fan configured to direct air over the indoor heat exchanger and into the room;
an indoor heat exchanger temperature sensor configured to detect a temperature of the indoor heat exchanger; and
a humidity sensor configured to detect an indoor humidity of the room.

8. The air conditioner unit of claim 7, wherein the auxiliary heating trigger comprises the dew point temperature of the room, wherein the controller is further configured to:
determine that the dew point temperature is above a first dew point threshold and below a second dew point threshold;
increase a compressor speed above the target compressor speed;
increase a speed of the outdoor fan; and
decrease a speed of the indoor fan.

9. The air conditioner unit of claim 8, wherein the controller is further configured to:
determine that the dew point temperature is above the second dew point threshold;
maintain the variable speed compressor at the target compressor speed; and
operate the electric heater at the first power level.

10. The air conditioner unit of claim 9, wherein the first dew point threshold is between 50- and 55-degrees Fahrenheit, and the second dew point threshold is between 56- and 60-degrees Fahrenheit.

11. The air conditioner unit of claim 8, wherein the controller is further configured to:
determine that the temperature of the indoor heat exchanger is greater than a third dew point threshold, the third dew point threshold being a predetermined amount less than the dew point temperature of the room;
determine that the dew point temperature is greater than the first dew point threshold; and
increase the compressor speed of the variable speed compressor.

12. The air conditioner unit of claim 7, wherein the dew point temperature is determined according to the indoor temperature and the indoor humidity.

13. The air conditioner unit of claim 1, wherein the first power level is about 1000 Watts, and the second power level is about 5000 Watts.

14. A method of operating an air conditioner unit, the air conditioner unit comprising a refrigeration loop, a variable speed compressor operably coupled to the refrigeration loop and being configured to urge a flow of refrigerant through the refrigeration loop, a temperature sensor operably coupled to the refrigeration loop, and an electric heater provided within the air conditioner unit, the method comprising:
operating the variable speed compressor at a target compressor speed;
identifying an auxiliary heating trigger of the air conditioner unit;
operating the electric heater at one of a first power level or a second power level greater than the first power level according to the auxiliary heating trigger of the air conditioner unit, wherein the auxiliary heating trigger is at least one of a setpoint error, a compressor limit speed, or a dew point temperature of a room;
determining that the target compressor speed is the compressor limit speed;
maintaining the variable speed compressor at the target compressor speed; and
directing the electric heater at the first power level.

15. The method of claim 14, further comprising:
determining that the setpoint error is greater than a first setpoint threshold;
maintaining the variable speed compressor at the target compressor speed; and
operating the electric heater at the first power level, wherein the setpoint error is a difference between an actual indoor temperature and a setpoint temperature.

16. The method of claim 14, wherein the air conditioner unit further comprises:
an outdoor fan configured to blow air over an outdoor heat exchanger;
an indoor fan configured to blow air over an indoor heat exchanger and into a room;
an indoor heat exchanger temperature sensor configured to detect a temperature of the indoor heat exchanger; and
a humidity sensor configured to detect an indoor humidity of the room.

17. The method of claim 16, wherein the auxiliary heating trigger comprises the dew point temperature of the room, the dew point temperature being above a first dew point threshold and below a second dew point threshold, the method further comprising:
increasing a compressor speed above the target compressor speed;
increasing a speed of the outdoor fan; and
decreasing a speed of the indoor fan.

18. The method of claim 17, further comprising:
determining that the dew point temperature is above the second dew point threshold;
maintaining the variable speed compressor at the target compressor speed; and
direct the electric heater at the first power level.

19. An air conditioner unit comprising:
a refrigeration loop comprising an outdoor heat exchanger and an indoor heat exchanger;
a variable speed compressor operably coupled to the refrigeration loop and being configured to urge a flow of refrigerant through the outdoor heat exchanger and the indoor heat exchanger;
an indoor temperature sensor configured to detect an indoor temperature of a room;
an electric heater provided within the air conditioner unit and configured to selectively produce heat to be supplied to the room according to a first power level or a second power level, the second power level being greater than the first power level;
an outdoor fan configured to direct air over the outdoor heat exchanger;
an indoor fan configured to direct air over the indoor heat exchanger and into the room;
an indoor heat exchanger temperature sensor configured to detect a temperature of the indoor heat exchanger; and
a humidity sensor configured to detect an indoor humidity of the room; and
a controller operably coupled to the variable speed compressor, the indoor temperature sensor, and the electric heater, the controller being configured to:
operate the variable speed compressor at a target compressor speed;
identify an auxiliary heating trigger of the air conditioner unit, wherein the auxiliary heating trigger is based on at least one of a setpoint error, the setpoint error being a difference between an actual indoor temperature and a setpoint temperature, a compressor limit speed, or a dew point temperature of the room;
determine that the dew point temperature is above a first dew point threshold and below a second dew point threshold;
increase a compressor speed above the target compressor speed;
increase a speed of the outdoor fan; and
decrease a speed of the indoor fan.

* * * * *